United States Patent
Park et al.

(10) Patent No.: US 8,331,729 B2
(45) Date of Patent: Dec. 11, 2012

(54) BLOCK-BASED OBJECT COUNTING APPARATUS AND METHOD

(75) Inventors: Hyun Hee Park, Seoul (KR); Sung Dae Cho, Yongin-si (KR); Min Kyu Park, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1000 days.

(21) Appl. No.: 12/353,279

(22) Filed: Jan. 14, 2009

(65) Prior Publication Data

US 2009/0180583 A1    Jul. 16, 2009

(30) Foreign Application Priority Data

Jan. 16, 2008  (KR) .................. 10-2008-0004873

(51) Int. Cl.
*G06K 9/36* (2006.01)
(52) U.S. Cl. ..................................... 382/286
(58) Field of Classification Search ............. 348/402.1, 348/699, E7.007; 382/192, 221, 271, 286
See application file for complete search history.

(56) References Cited

FOREIGN PATENT DOCUMENTS

KR     2003-0018487        3/2003

OTHER PUBLICATIONS

Park et al., "Development of a Block-Based Real-Time People Counting System", 2006, Retrived from the Internet:<URL:http://www.springerlink.com/content/x56135t018313t62/fulltext.pdf>.*
Park et al., "Development of a Block-Based Real-Time People Counting System", 2006, Retrived from the Internet:www.springerlink.com/contentJx56135t018313t62/fulltext.pdf>.*

* cited by examiner

*Primary Examiner* — Gregory F Cunningham
(74) *Attorney, Agent, or Firm* — Cha & Reiter, LLC

(57) ABSTRACT

A block-based object counting apparatus and a block-based object counting that improves the counting of objects by using a camera. The object counting apparatus includes: a camera acquiring an image; a storage unit for storing average sizes and error data of an object in units of image blocks; and a control unit having a data inputter for receiving the acquired image for input, an object size determinator for determining appearance of the object by comparing a current image with a previous image and then determining the size of the object, a block determinator for determining a block where the object is located, and a counter for counting the object and fixing the counting of the object by comparing the size and location data of the object with data stored in a storage unit.

20 Claims, 10 Drawing Sheets

BLOCK-BASED OBJECT COUNTING APPARATUS AND METHOD

CLAIM OF PRIORITY

This application claims priority to an application entitled "BLOCK-BASED OBJECT COUNTING APPARATUS AND METHOD" filed in the Korean Intellectual Property Office on Jan. 16, 2008 and assigned Serial No. 2008-0004873, the contents of which are incorporated herein by reference in its entirety.

BACKGROUND OF THE INVENTION

1. Field of the Invention

The present invention relates generally to a block-based object counting apparatus and a block-based object counting method. More particularly, the present invention relates to a block-based object counting apparatus and a block-based object counting method that enables accurate counting of objects passing through an interested block by cameras using image processing technology.

2. Description of the Related Art

It is necessary to accurately count pedestrians or moving objects in various fields. For example, it is very important to know the directions and the number of pedestrians moving through an entrance, an elevator, or an escalator of a shopping mall or a large building. In other words, a shopping mall can more effectively advertise products or efficiently dispose products or stores without the addition of separate spaces, by recognizing flow of pedestrians and analyzing traffic, using count information.

Conventional pedestrian or object counting systems count people or objects passing through doors simply using sensors, but frequently cause considerable counting errors due to characteristics of sensors when a plurality of people or objects simultaneously pass through doors.

In order to overcome the above-mentioned problem, in recent years, an image processing technology using images acquired by cameras has become increasingly popular as a means to provide an accurate count of a plurality of pedestrians or objects. This image processing technology counts objects existing within visual fields of cameras installed at high locations by tracing and extracting the objects. The image processing technology, however, considers neither a change in the size of an object due to the relative position of the object to a camera nor, the fact that almost all cameras are designed to monitor a wider area using a lens having a wider visual field, causing distortion of an image. In other words, counting of pedestrians or objects without consideration of a change in size due to their relative positions to a camera and distortion of images causes counting errors. Therefore, there is a long-felt need to both consider changes in size due to the relative positions of a plurality of pedestrians or objects passing through an interested block to a camera, and for a more accurate counting of the pedestrians or objects by calibrating errors generated by distortion of images created using lenses.

SUMMARY OF THE INVENTION

The present invention has been made in part at least in view of some of the above-mentioned problems. The present invention overcomes issues associated with conventional pedestrian counting systems that utilize sensors. The present invention provides a block-based object counting apparatus and a block-based object counting method that provides a more accurate counting of objects passing through an interested block.

In accordance with an exemplary embodiment of the present invention, there is provided a block-based object counting method that may include: determining average sizes and errors of an object in units of image blocks according to a height of a camera; extracting the object from an image acquired by the camera and determining a block containing the object; and fixing the counting of the object, by tracing the object.

In accordance with another exemplary embodiment of the present invention, there is provided a block-based object counting apparatus that may include: a camera for acquiring an image; a storage unit for storing average sizes and error data of an object in units of image blocks; and a control unit having a data input unit for inputting the acquired image, an object size determinator determining appearance of the object by comparing a current image with a previous image and then determining a size of the object, a block determinator determining a block where the object is located, and a counter counting the object and fixing the counting of the object by comparing the size and location data of the object with data stored in the storage unit.

According to the present invention block-based object counting apparatus and a block-based object counting method enable accurate counting of objects passing through an interested block, by partitioning an image acquired by a camera into blocks and calculating sizes of an object in units of blocks, considering a change in size of the image from the camera according to the relative position of the object to the camera.

BRIEF DESCRIPTION OF THE DRAWINGS

The objects, features and advantages of the present invention will be more apparent from the following detailed description in conjunction with the accompanying drawings, in which.

DETAILED DESCRIPTION

A detailed description of the present invention is provided in the accompanying description and drawings for illustrative purposes. The examples provided herein have been provided for illustrative purposes and does not limit the claimed invention to the examples shown and described herein.

In exemplary embodiments of the present invention, 'counting of pedestrians' typically refers to a determination of how many pedestrians pass through an area such as a set line, considering the sizes, i.e. the number of pixels of pedestrians in an interested block of a camera image. 'Fixing counting of pedestrians' typically refers to fixing the number of counted pedestrians as an interested counted object when pedestrians pass through an area such as a set line.

'A reference image' is typically defined as a reference image necessary to detect an appearance of a pedestrian or a change in the background. 'A previous image' is typically defined as an image acquired before a current image is acquired by a camera.

Hereinafter, exemplary embodiments of the present invention will be described in detail with reference to the accompanying drawings so that a person skilled in the art can practice the present invention.

According to the present invention, an object that is counted may include any moving object, including but in no way limited to a vehicle or a pedestrian. It is assumed herein in the following example that an object that is to be counted is a pedestrian.

Figure 1A:
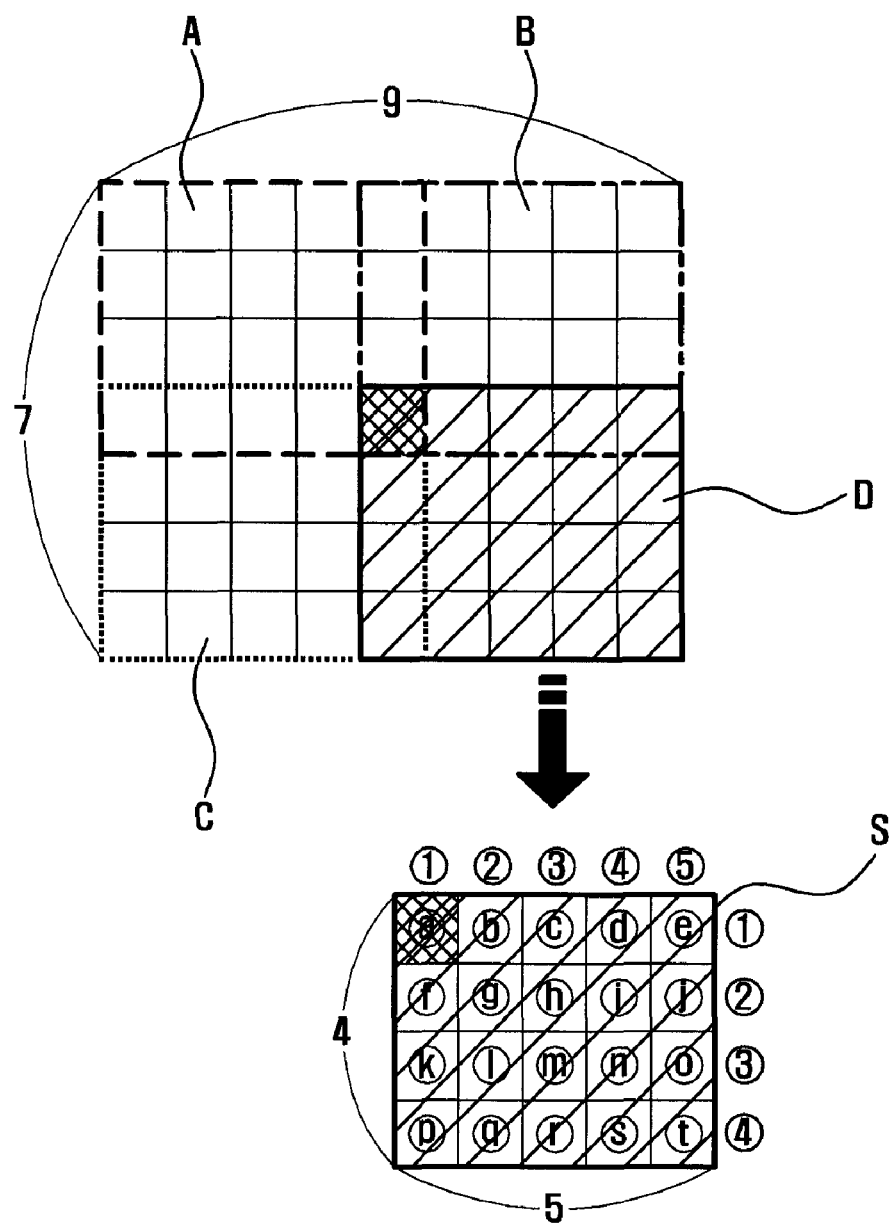
FIGS. 1A and 1B are views illustrating an image block partitioning method for calculating sizes of an object in units of blocks according to an exemplary embodiment of the present invention.
Figure 1B:
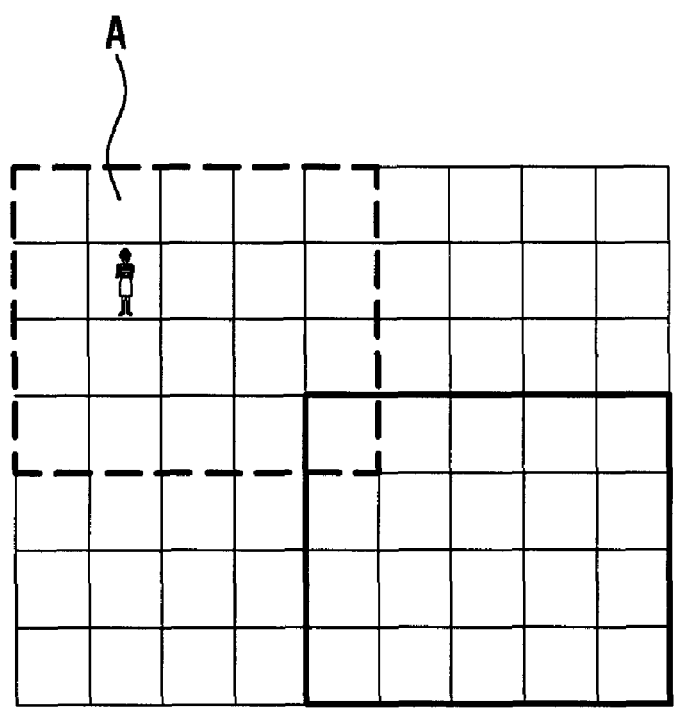
Figure 1B:
Figure 1B:
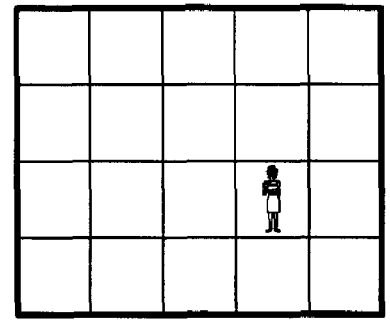

FIGS. 1A and 1B are examples of views illustrating an image block partitioning method for calculating sizes of an object in units of blocks that is used in a block-based object counting apparatus and a block-based object counting method according to one or more exemplary embodiments of the present invention.

In contrast to the claimed invention, conventional pedestrian counting systems do not consider changes in size of an image of a pedestrian and distortion of the image according to the relative positions of the pedestrian to a camera and apply the same size to the same pedestrian regardless of the locations of the pedestrian, causing counting errors.

In a block-based object counting apparatus and a block-based object counting method according to exemplary embodiments of the present invention, as illustrated in FIG. 1A, an image acquired by a camera is partitioned into transverse and longitudinal grids with reference to a preset length. Counting errors occurring due to distortion of lenses may be calibrated in units of blocks, by calculating average sizes occupied by one pedestrian in portioned blocks. Hereinafter, it is assumed that an image is typically partitioned into blocks of nine by seven transversely and longitudinally, as illustrated in FIG. 1A.

In the aforementioned exemplary case, distortions of an image that occurs in the partitioned blocks respectively are symmetrical to each other in the upward, downward, right, and left directions with reference to the center block of the image. Therefore, not all the portioned blocks, but only the hatched blocks of the camera image (illustrated in FIG. 1A) may be considered using the symmetrical relationship in order to achieve convenience of calculation. It is also assumed herein in this example that the blocks of nine by seven are partitioned further into four blocks of 5 by 4, i.e. blocks A to D. In descriptions of the exemplary embodiments of the present invention, the block D is a reference block and is referred to a block S (a sampling block). In the block S, columns 1 to 5 are sequentially designated from the left to the right and rows 1 to 4 are sequentially designated from the upper side to the lower side. The hatched block "a" in the block S is defined as a block of row 1 and column 1.

FIG. 1B is an exemplary view illustrating that a pedestrian is extracted from a block of an image acquired by a camera. In this particular case, it can be seen that the block from which the pedestrian is extracted corresponds to the block A in the image and is one symmetrical to a block where the pedestrian is displayed in the sampling block, i.e. the block S.

Figure 2:
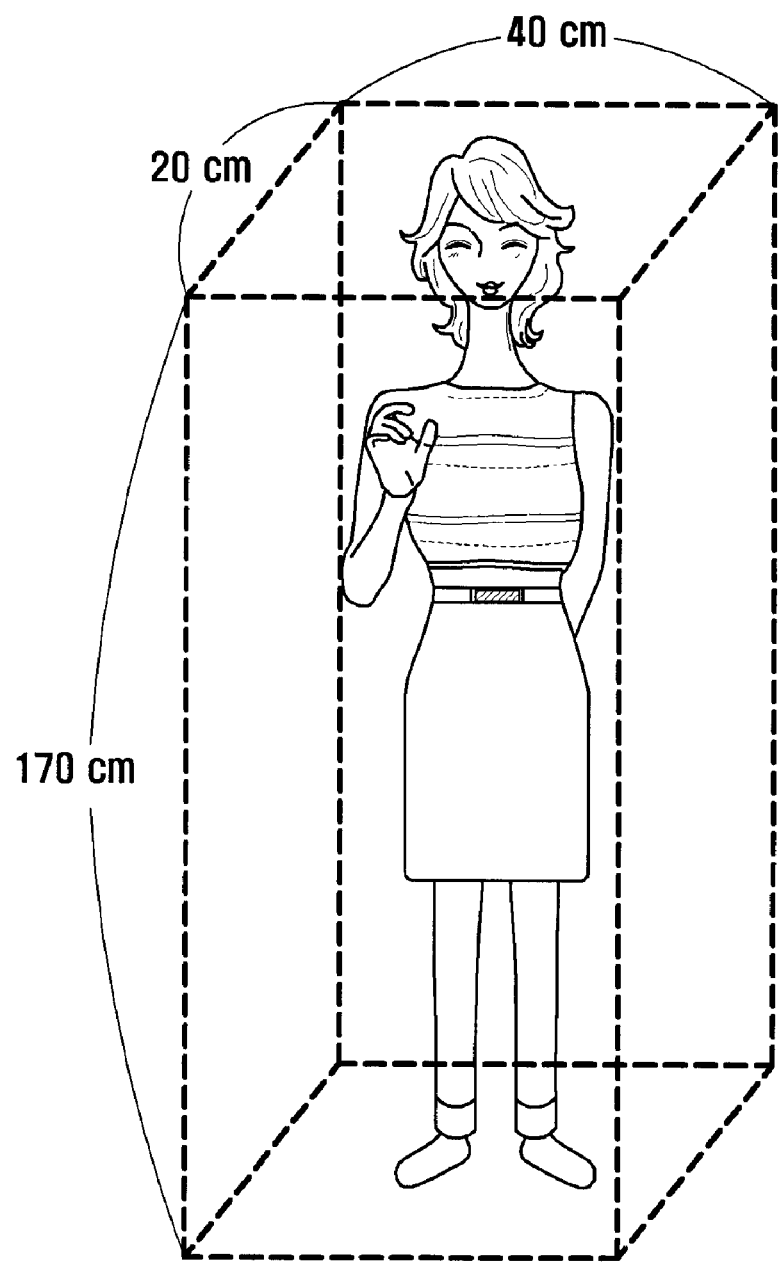
FIG. 2 is a view illustrating an example of a pedestrian being modeled by its approximation to a hexahedron for calculate average sizes occupied by the pedestrian in the blocks partitioned in FIG. 1.

FIG. 2 is an exemplary view illustrating that a pedestrian is modeled by its approximation to a hexahedron to calculate average sizes occupied by one pedestrian in the blocks partitioned in FIG. 1.

As illustrated in FIG. 2, in the exemplary embodiment of the present invention, the size of a pedestrian input to a camera image is modeled as a hexahedron having a width of 40 cm, a length of 20 cm, and a height of 170 cm. These dimensions and the hexahedron are provided only for explanatory purposes and can be varied.

Tables 1 and 2 represent the sizes of a pedestrian that are measured in the blocks in FIGS. 1A and 1B using the above dimensions as a model size of a pedestrian. In this case, the size of the pedestrian equals a number of pixels occupied by the pedestrian in the partitioned blocks.

TABLE 1

| Height of camera (cm) | | Average sizes occupied by one pedestrian in partitioned blocks (pixels) | | | | |
|---|---|---|---|---|---|---|
| | | 1 | 2 | 3 | 4 | 5 |
| 250 | 1 | 1622.936 | 1594.425 | 1787.093 | 1823.639 | 347.2833 |
| | 2 | 1592.461 | 1575.451 | 1674.422 | 1673.891 | 277.0611 |
| | 3 | 1644.245 | 1572.393 | 1722.841 | 1723.386 | 310.9017 |
| | 4 | 383.5506 | 385.7254 | 441.7081 | 531.3391 | 290.362 |
| 280 | 1 | 938.7442 | 970.9868 | 1166.709 | 1251.198 | 328.3096 |
| | 2 | 948.9729 | 957.077 | 1126.509 | 1194.941 | 269.566 |
| | 3 | 1119.781 | 1072.188 | 1192.766 | 1216.437 | 295.8518 |
| | 4 | 311.4282 | 310.4942 | 361.2175 | 434.5884 | 278.1188 |
| 310 | 1 | 607.6371 | 660.3599 | 822.4886 | 902.3442 | 274.6391 |
| | 2 | 639.5638 | 667.0172 | 794.8201 | 895.3939 | 256.5627 |
| | 3 | 807.8462 | 784.4541 | 872.684 | 905.9476 | 295.0597 |
| | 4 | 326.817 | 339.7653 | 381.7649 | 457.5639 | 260.9169 |

TABLE 1-continued

| Height of camera | | Average sizes occupied by one pedestrian in partitioned blocks (pixels) | | | |
|---|---|---|---|---|---|---|
| (cm) | | 1 | 2 | 3 | 4 | 5 |
| 340 | 1 | 421.6171 | 489.3669 | 618.7723 | 675.1167 | 257.7211 |
|  | 2 | 466.1534 | 508.011 | 612.5546 | 673.3219 | 266.5578 |
|  | 3 | 602.8113 | 600.8104 | 651.4499 | 699.6124 | 273.4944 |
|  | 4 | 323.5158 | 336.8029 | 388.001 | 460.4255 | 272.1455 |
| 370 | 1 | 309.9264 | 379.2238 | 485.8551 | 538.9121 | 290.6136 |
|  | 2 | 369.3752 | 401.0912 | 490.2323 | 540.4185 | 213.3451 |
|  | 3 | 475.3793 | 477.3206 | 519.8285 | 556.8695 | 246.7416 |
|  | 4 | 275.3442 | 289.7714 | 328.8866 | 372.8732 | 234.3427 |
| 400 | 1 | 234.9241 | 301.3781 | 384.6998 | 433.723 | 203.1943 |
|  | 2 | 291.4472 | 318.9143 | 390.5238 | 439.4875 | 210.3462 |
|  | 3 | 375.7578 | 392.8849 | 416.6036 | 450.1648 | 229.732 |
|  | 4 | 262.6385 | 278.8834 | 361.6707 | 364.3249 | 247.1536 |
| 430 | 1 | 181.3635 | 246.9201 | 321.286 | 366.9851 | 203.1348 |
|  | 2 | 241.9752 | 267.6979 | 331.9633 | 368.2946 | 221.7652 |
|  | 3 | 313.5023 | 320.4435 | 350.6395 | 378.9307 | 243.1107 |
|  | 4 | 247.5657 | 264.415 | 294.4187 | 322.6687 | 248.8614 |

Table 1 represents examples of average sizes (average numbers of pixels) of a pedestrian in partitioned blocks according to heights of a camera. In Table 1, columns 1 to 5 are sequentially designated from the left to the right and rows 1 to 4 are sequentially designated from the upper side to the lower side. Columns 1 to 5 and rows 1 to 4 are matched in blocks of 5 by 4, as illustrated in the example shown in FIG. 1A. For example, it can be seen in Table 1 that when a camera is 250 cm high from the ground, the average size of a pedestrian that is measured in a block of row 1 and column 1 of a camera image block partitioned in FIG. 1 is 1622.936 pixels. In other words, when a camera of a pedestrian counting apparatus according to this exemplary embodiment of the present invention is 250 cm high from the ground, a pedestrian occupying approximately 1622 pixels in the block of row 1 and column 1 is counted as one pedestrian and pedestrians occupying approximately 3244 (1622*2) pixels are counted as two pedestrians.

In this case, the average sizes of a pedestrian in the partitioned blocks according to the heights of a camera may be approximated to and expressed in a polynomial in Formula 1.

$$m = a1*x^3 + a2*x^2 + a3*x + a4 \quad \text{(Formula 1)}$$

Values of m and coefficients of a1 to a4 are represented in Table 2 as follows.

TABLE 2

|  | a1 | a2 | a3 | a4 |
|---|---|---|---|---|
| m(a) | −0.00045272 | 0.52238 | −202.55 | 26670 |
| m(b) | −0.00040819 | 0.47099 | −182.88 | 24244 |
| m(c) | −0.00035716 | 0.41909 | −166.37 | 22756 |
| m(d) | −0.00028369 | 0.34133 | −139.52 | 19797 |
| m(e) | 4.7317e(−5) | −0.044713 | 12.807 | −797.5 |
| m(f) | −0.00043495 | 0.50027 | −193.31 | 25437 |
| m(g) | −0.00041529 | 0.47624 | −183.71 | 24211 |
| m(h) | −0.00031058 | 0.36609 | −146.18 | 20186 |
| m(i) | −0.00020079 | 0.24727 | −104.13 | 15385 |
| m(j) | 4.8499e(−5) | −0.049229 | 15.961 | −1397.8 |
| m(k) | −0.00026158 | 0.31347 | −127.72 | 18063 |
| m(l) | −0.00027316 | 0.32195 | −128.93 | 17944 |
| m(m) | −0.00025019 | 0.3026 | −124.6 | 17863 |
| m(n) | −0.0002357 | 0.284 | −117.2 | 1696 |
| m(o) | 4.7911e(−5) | −0.04828 | 15.428 | −1282.2 |
| m(p) | −3.6751e(−5) | −0.038214 | −13672 | 1977.2 |
| m(q) | −4.085e(−5) | −0.041863 | −14.611 | 2048.4 |
| m(r) | −4.6157e(−5) | 0.047234 | −16522 | 2329.2 |
| m(s) | −5.5264e(−5) | 0.055536 | −19.264 | 2725.5 |
| m(t) | 1.6501e(−5) | −0.01522 | 4.2698 | −84.908 |

In Table 2, a1 to a4 represent the coefficients a1 to a4 of the polynomial of Formula 1, and the value of x represents the height of a camera. The m(a) to m(t) represents the average sizes of a pedestrian in the blocks a to t of the block of 5 by 4 that are illustrated in FIG. 1A.

TABLE 3

| Height of camera | | Average errors occurring in partitioned blocks (pixels) | | | | |
|---|---|---|---|---|---|---|
| (cm) | | 1 | 2 | 3 | 4 | 5 |
| 250 | 1 | 66.44778 | 226.9268 | 68714.71 | 219447.4 | 22536.75 |
|  | 2 | 159.5206 | 3817.319 | 83840.95 | 335863.4 | 4275.041 |
|  | 3 | 159242.1 | 132666.2 | 36456.91 | 54745.5 | 4279.029 |
|  | 4 | 16782.6 | 14786.37 | 18281.22 | 22000.3 | 2116.434 |
| 280 | 1 | 4.162996 | 3491.242 | 36594.43 | 66239.6 | 9451.59 |
|  | 2 | 1638.43 | 5677.019 | 25116.26 | 59353.72 | 2721.044 |
|  | 3 | 42080.12 | 31521.49 | 29210.33 | 39966.77 | 1660.38 |
|  | 4 | 13499.5 | 7419.188 | 5233.152 | 7449.953 | 2012.677 |
| 310 | 1 | 26.18753 | 5895.967 | 19665.5 | 38046.96 | 6569.518 |
|  | 2 | 2727.227 | 2309.853 | 7354.553 | 18211.28 | 2574.369 |
|  | 3 | 16752.31 | 11881.91 | 23872.97 | 22791.52 | 1195.442 |
|  | 4 | 10266.01 | 2975.839 | 3012.635 | 8249.957 | 1777.573 |
| 340 | 1 | 18.08301 | 3102.931 | 11305.57 | 23092.5 | 7316.281 |
|  | 2 | 3210.867 | 2008.108 | 4248.853 | 10047.6 | 2890.56 |
|  | 3 | 9548.364 | 4773.846 | 16518.12 | 11629.48 | 3299.14 |
|  | 4 | 9756.356 | 3416.609 | 7359.099 | 12900.6 | 1429.201 |
| 370 | 1 | 4.833333 | 2042.238 | 7220.296 | 13441.38 | 2077.607 |
|  | 2 | 1409.417 | 883.7445 | 2540.326 | 6305.956 | 2153.569 |
|  | 3 | 6004.998 | 3895.249 | 10916.44 | 6444.271 | 2655.572 |
|  | 4 | 7226.53 | 2951.896 | 3138.661 | 10178.18 | 2692.806 |
| 400 | 1 | 78.52026 | 1513.772 | 4537.493 | 9179.688 | 3054.058 |
|  | 2 | 1270.61 | 710.3357 | 1804.503 | 5167.436 | 2051.955 |
|  | 3 | 4357.124 | 1684.806 | 6145.027 | 5285.871 | 2337.955 |
|  | 4 | 5745.013 | 1777.616 | 4083.309 | 9238.892 | 1255.001 |

TABLE 3-continued

| Height of camera (cm) | | Average errors occurring in partitioned blocks (pixels) | | | | |
|---|---|---|---|---|---|---|
| | | 1 | 2 | 3 | 4 | 5 |
| 430 | 1 | 30.52018 | 804.6882 | 3122.146 | 6677.223 | 3843.177 |
| | 2 | 797.2635 | 887.3775 | 950.5431 | 2688.452 | 1578.742 |
| | 3 | 3036.616 | 1636.183 | 4573.988 | 4344.682 | 1668.782 |
| | 4 | 5595.674 | 2294.602 | 2972.267 | 6588.375 | 4705.809 |

Table 3 represents average errors (average numbers of pixels) of a pedestrian in partitioned blocks according to heights of a camera. In Table 1, columns 1 to 5 are sequentially designated from the left to the right and rows 1 to 4 are sequentially designated from the upper side to the lower side. Columns 1 to 5 and rows 1 to 4 are matched in blocks of 5 by 4, as illustrated in FIG. 1A. For example, it can be seen in Table 3 that when a camera is 250 cm high from the ground, the average error of a pedestrian that is measured in a block of row 1 and column 1 of a camera image block partitioned in FIG. 1 is 66 pixels. That is, Referring to Table 1 and Table 2, when a camera of a pedestrian counting apparatus according to the exemplary embodiment of the present invention is 250 cm high from the ground, a pedestrian occupying approximately 1566 (1622−66) to 1684 (1622+62) pixels in the block of row 1 and column 1 is counted as one pedestrian.

In this case, the average errors of a pedestrian in the partitioned blocks according to the heights of a camera may be approximated to and expressed in a polynomial in Formula 2.

$$v = b1*x^3 + b2*x^2 + b3*x + b4 \quad \text{(Formula 2)}$$

TABLE 4

| | b1 | b2 | b3 | b4 |
|---|---|---|---|---|
| v(a) | −9.1492e(−5) | 0.097548 | −34.003 | 3898 |
| v(b) | 0.0065936 | −7.1364 | 2517.3 | −2.8616e(5) |
| v(c) | −0.021698 | 25.218 | −9812.1 | 1.2842e(6) |
| v(d) | −0.13488 | 149.27 | −54802 | 6.69e(6) |
| v(e) | −0.0080289 | 9.204 | −3511 | 4.4952e(5) |
| v(f) | 0.0023903 | −2.37089 | 997.85 | −1.1749e(5) |
| v(g) | 0.0035626 | −3.5557 | 1135.99 | −1.1315e(5) |
| v(h) | −0.056342 | 62.459 | −22935 | 2.7922e(6) |
| v(i) | −0.27478 | 301.16 | −1091e(5) | 1.3066e(7) |
| v(j) | −0.0016527 | 1.7323 | −606.15 | 73229 |
| v(k) | −0.11084 | 122.38 | −44742 | 5.4223e(6) |
| v(l) | −0.95892 | 105.81 | −38642 | 4.6733 |
| v(m) | 0.0042581 | −3.8841 | 953.45 | −25940 |
| v(n) | 0.0006454 | 1.4743 | −1512.5 | 303151e(5) |
| v(o) | −0.00048848 | 5.0485 | −114.1 | 19339e(5) |
| v(p) | −0.00040428 | 0.68205 | −383.08 | 76159 |
| v(q) | −0.0070299 | 7.8771 | −2934.7 | 3.6575e(5) |
| v(r) | −0.014697 | 15.763 | −5586.6 | 6.5841e(5) |
| v(s) | −0.01968 | 20.551 | −7073.9 | 8.122e(5) |
| v(t) | 0.0025019 | −2.3537 | 725.65 | −71394 |

In Table 4 above, b1 to b4 represent the coefficients b1 to b4 of the polynomial of Formula 2, and the value of x represents the height of a camera. The v(a) to v(t) represents the average errors of a pedestrian in the blocks a to t of the block of 5 by 4 that are illustrated in FIG. 1A.

Figure 3:
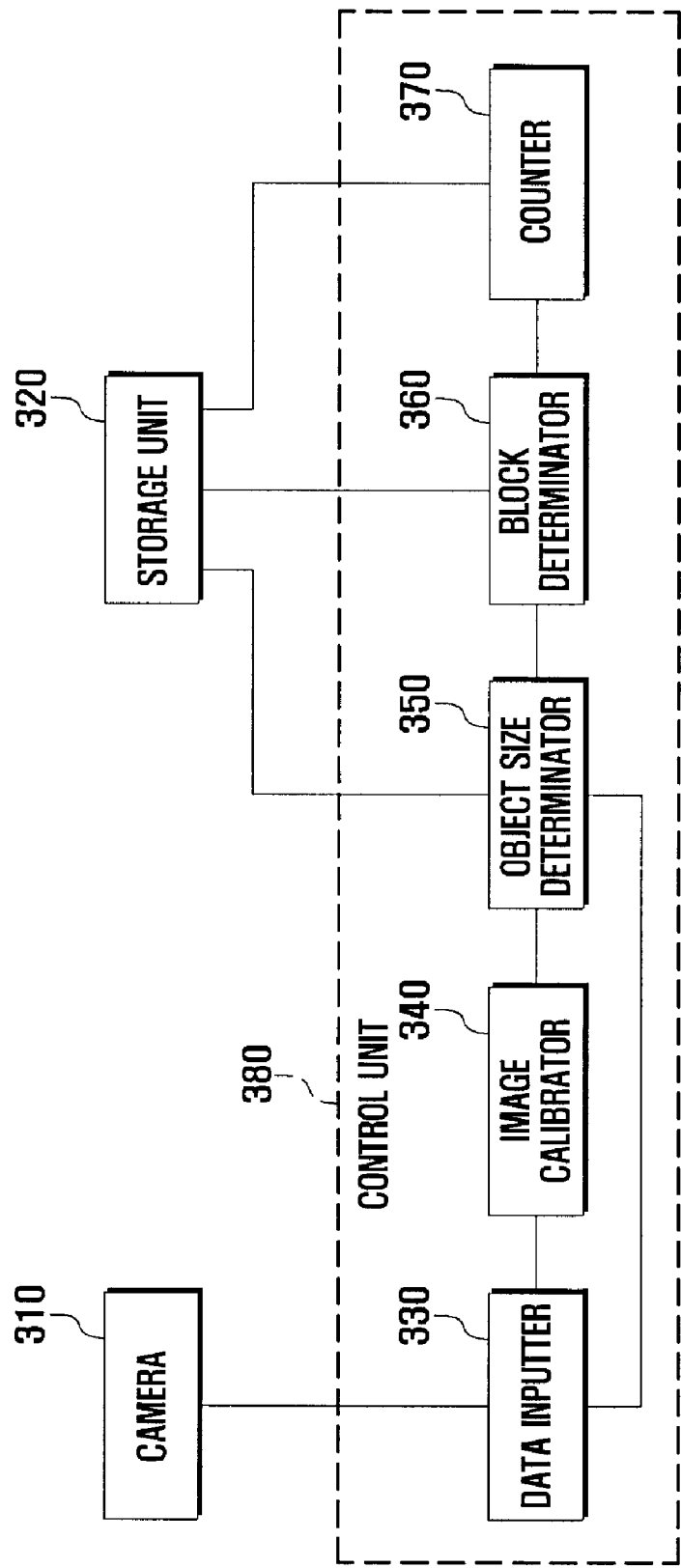
FIG. 3 is a view illustrating an example of the internal structure of a block-based object counting apparatus according to an embodiment of the present invention.

FIG. 3 is a view illustrating the internal structure of a block-based object counting apparatus according to an exemplary embodiment of the present invention.

Still referring to FIG. 3, the block-based object counting apparatus may include, for example, a camera 310, a storage unit 320, and a control unit 380 and The control unit 380 may include, for example, a data inputter 330, an image calibrator 340, an object size determinator 350, a block determinator 360, and a counter 370.

The camera 310 may be installed at a desired position and be used to acquire a camera image. Whereas almost all systems that count pedestrians passing specific areas use sensors (and suffer from counting errors when a plurality of pedestrians simultaneously pass through specific areas), through the use of a camera, the present invention more accurately counts pedestrians by applying an image processing technology using an image acquired by the camera.

The storage unit 320 stores programs and data necessary for the overall operation of the block-based object counting apparatus according to the exemplary embodiment of the present invention. In particular, the storage unit 320 may store tables representing average sizes (Table 1) and errors (Table 3) of a pedestrian in units of blocks according to the heights of a camera 310 and polynomials (Formula 1, Table 2, Formula 2, and Table 4) expressing the tables. The storage unit 320 may store, for example, a program, a reference image, and a previous image that are necessary to extract a pedestrian from an image acquired by a camera 310 and trace and count a pedestrian.

The data inputter 330 is an interface that receives image information acquired by and transferred from the camera 310 to process a signal.

The image calibrator 340 may receive a camera image transferred from the data inputter 330 and may calibrate distortion of the camera image using a calibration toolbox or Jung's algorithm. According to the exemplary embodiment of the present invention, distortion of an image transferred from the data inputter 330 may be calibrated by the image calibrator 340 but may be omitted in another exemplary embodiment of the present invention.

The image calibrator 340 may use both the calibration toolbox and Jung's algorithm to calibrate distortion of an image, but in another exemplary embodiment may use only one of the calibration toolbox and Jung's algorithm. The calibration toolbox may be provided from an application program, for example, such as Matlab or C++. Jung's algorithm is described in detail in "Radial Distortion Refinement by Inverse Mapping-Based Extrapolation" [Jung H. G., Yun H. L., Pal J. Y., and Jaihie K., "Radial Distortion Refinement by Inverse Mapping-based Extrapolation", 18th International Conference on Pattern Recognition. Aug. 20-24, 2006, Hong Kong, P. 675-678], the contents of which are incorporated by reference and the description thereof will be omitted.

The object size determinator 350 receives a camera image transferred from the data inputter 330 or the image calibrator 340, analyzes it, and compares the current image with a previous image. When a change in the current image deviates a preset range, a pedestrian is determined to appear and is extracted. The object size determinator 350 may determine the size, i.e. the number of pixels occupied by the extracted pedestrian in the camera image.

The block determinator 360 determines to which block the pedestrian extracted by the object size determinator 350 corresponds among the block A, the block B, the block C, and the block D. The block determinator 360 matches a block where the pedestrian is located with a block (blocks a to t) in the block S illustrated in FIG. 1A.

The counter 370 receives the size, i.e. the number of pixels of the pedestrian extracted by the object size determinator 350 and the location block of the pedestrian that is determined by the block determinator, and counts the extracted pedestrian with reference to the average sizes and errors of the pedestrian in units of the blocks that are stored in the storage unit 320. For example, when the size, i.e. the number of pixels of the pedestrian is 1610 and the block where the pedestrian is located is matched with the block "a" of the block S, the counter 370 counts the pedestrian as one.

The counter may trace the extracted pedestrian by detecting a motion vector of the pedestrian. The counter 370 may set a first count line and a second count line in the acquired camera image, and fix counting of the pedestrian simultaneously passing through the first count line and the second count line.

Figure 4:
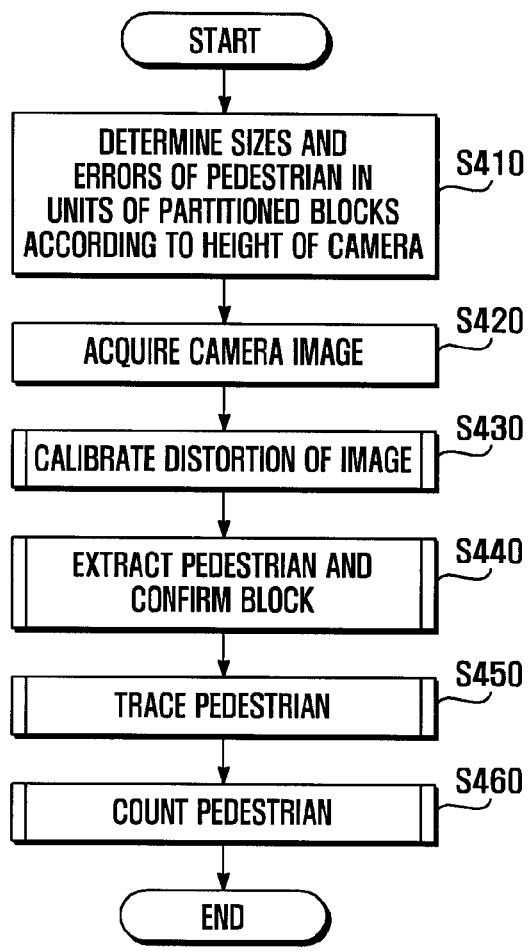
FIG. 4 is a flowchart illustrating a method of extracting, tracing, and counting a moving pedestrian after acquiring an image from a camera in the block-based object counting apparatus according to an exemplary embodiment of the present invention.

FIG. 4 is a flowchart illustrating an example of a method of extracting, tracing, and counting a moving pedestrian after acquiring an image from a camera in the block-based object counting apparatus according to an exemplary embodiment of the present invention.

In the step S410, when a camera 310 is installed at a desired height, an average size (pixels) and an error (pixels) of a pedestrian in partitioned blocks according to the height are determined using Formulas 1 and 2 discussed herein above.

Still referring to FIG. 4, the object counting apparatus and method according to the exemplary embodiments of the present invention counts a pedestrian and fixes the number of counted pedestrians according to the average sizes and errors of the pedestrian in units of blocks. In the step S420, the control unit 380 receives an image acquired by the camera 310 and recognizes it. In this case, the received image is distorted due to a relative position of an object to the camera and use of a lens for securing a visual field. Then, in the step S430, the control unit 380 may calibrate the image received from the camera 310 to reduce distortion of the image. The step S430 of calibrating an image may be performed in the exemplary embodiment of the present invention, but may be omitted in another exemplary embodiment of the present invention. In the step S440, the control unit 380 extracts a pedestrian from the calibrated image and confirms the block containing the extracted pedestrian in the acquired camera image.

In the step S450, the control unit 380 traces the pedestrian extracted in the previous step, and in the step S460, counts the pedestrian.

Figure 5:
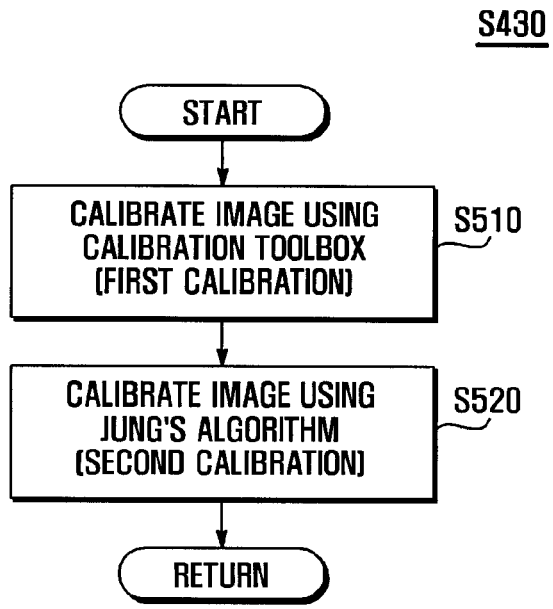
FIG. 5 is a flowchart illustrating in exemplary detail the step S430 of calibrating an image acquired from the camera to remove distortion of the image in the block-based object counting apparatus according to an exemplary embodiment of the present invention.

FIG. 5 is a flowchart illustrating in more detail the step S430 of calibrating an image acquired from the camera to remove distortion of the image in the block-based object counting apparatus according to the exemplary embodiment of the present invention.

In the step S510, the control unit 380 performs a first calibration of a distorted image using a calibration toolbox. The calibration toolbox may be provided from an application program such as Matlab or C++, but is not limited thereto and may constitute many other ways to perform a first calibration of the distorted image. In the step S520, the control unit 380 performs a second calibration of the image to which the first calibration is performed, using Jung's algorithm (incorporated by reference above). The image to which the first and second calibrations are performed may be used as an image for counting a pedestrian.

Figure 6:
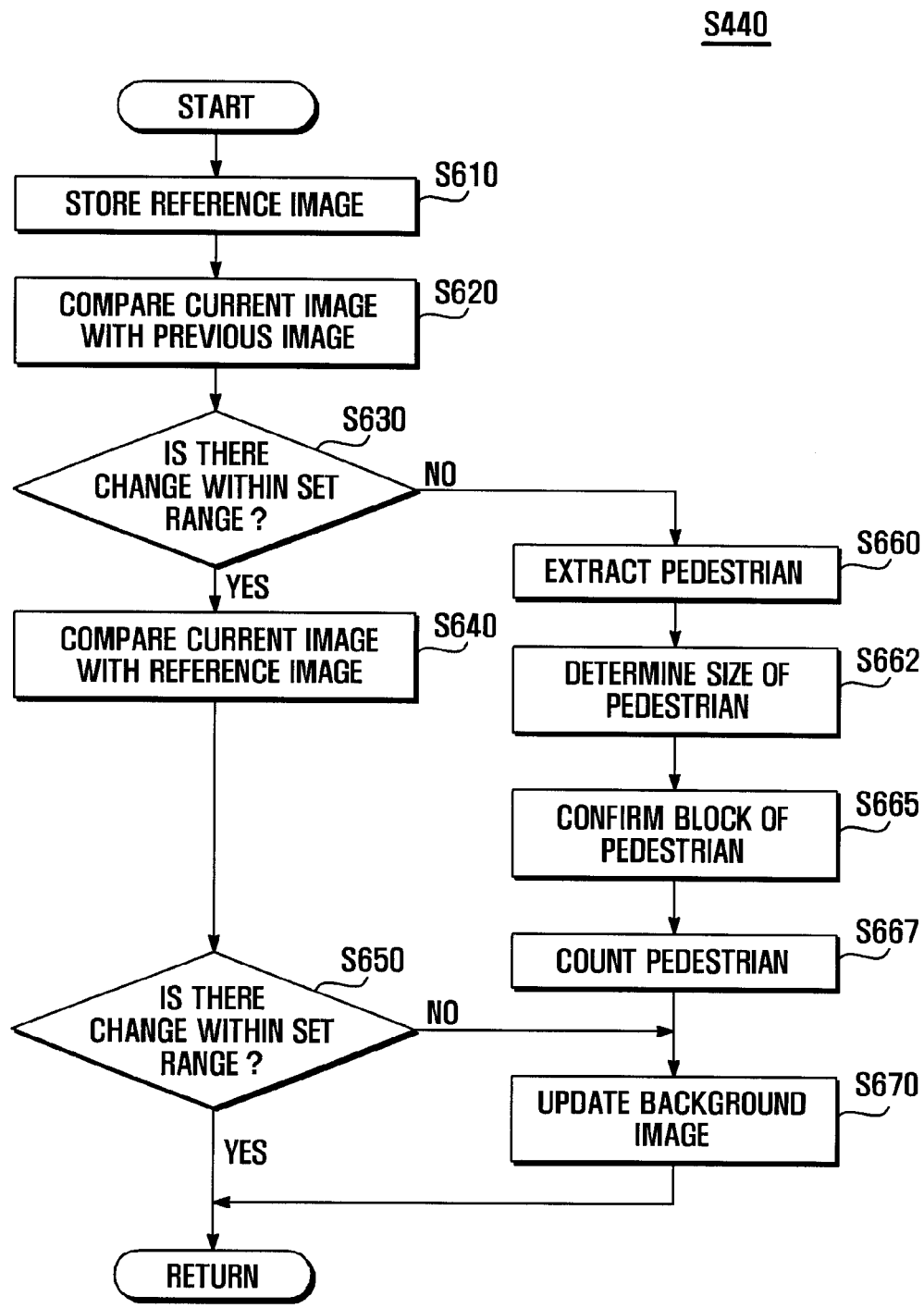
FIG. 6 is a flowchart illustrating in exemplary detail the step S440 of extracting the pedestrian from the acquired image and determining a block corresponding to the extracted pedestrian in the block-based object counting apparatus according to an exemplary embodiment of the present invention.

FIG. 6 is a flowchart illustrating in detail the step S440 of extracting the pedestrian from the acquired image and determining a block corresponding to the extracted pedestrian in the block-based object counting apparatus according to the exemplary embodiment of the present invention.

Referring now to FIG. 6, in step S610, the control unit 380 may store an image obtained first after the block-based object counting apparatus starts the operation thereof as a reference image. The reference image may be one necessary for extracting, tracing, and counting a pedestrian by the block-based object counting apparatus according to the exemplary embodiment of the present invention. In step S620, the control unit 380 compares the current acquired image with a previously acquired image and calculates a difference between them. In step S630, the control unit 380 analyzes the difference between the current image and the previous image, and determines that a pedestrian does not exist when the current image is changed within a preset range as compared with the previously acquired image. In this case, the preset range may be about 0 to 5 percent, which is the same in the following exemplary description.

In step S640, the control unit 380 calculates a difference between the current image and the reference image stored in step S610 in order to determine whether a background image is to be updated. When the control unit 380 determines that the current image is changed within the preset range in step S650, it determines that a background image does not need to be updated, and therefore does not update the background image. On the other hand, when the control unit 380 determines that a change in the current image out of the preset range is detected, it determines that the background image is changed and in step S670, updates the background image. Update of the background image may be carried out by updating the current image to a new reference image.

On the other hand, when the control unit 380 determines that a change in the current image is not within the preset range in step S630 (that is, when a change of more than 5 percent is detected), it determines that a pedestrian appears, and in the step S660, extracts the pedestrian. In step S662, the control unit 380 may determine the size, i.e. the number of pixels occupied by the extracted pedestrian. In step S665, the control unit 380 checks which block of the camera image the extracted pedestrian corresponds to and in step S667, counts the extracted pedestrian. In counting the extracted pedestrian, the control unit 380 counts the pedestrian with reference to the size, i.e. the number of pixels of the extracted pedestrian, the location block of the pedestrian, and the formulas on the average sizes and errors of the pedestrian that are stored in the storage unit 320 in units of blocks.

For example, when the camera 310 is 250 cm high, the location block of the extracted pedestrian is the block of row 1 and column 1 in the block D of FIG. 1A, and the size of the pedestrian is 3250 pixels, the control unit 380 counts the pedestrian as two pedestrians. In step S670, the control unit 380 updates the background image. Update of the background image may be carried out by updating the current image except for the extracted pedestrian to a new reference image.

Figure 7:
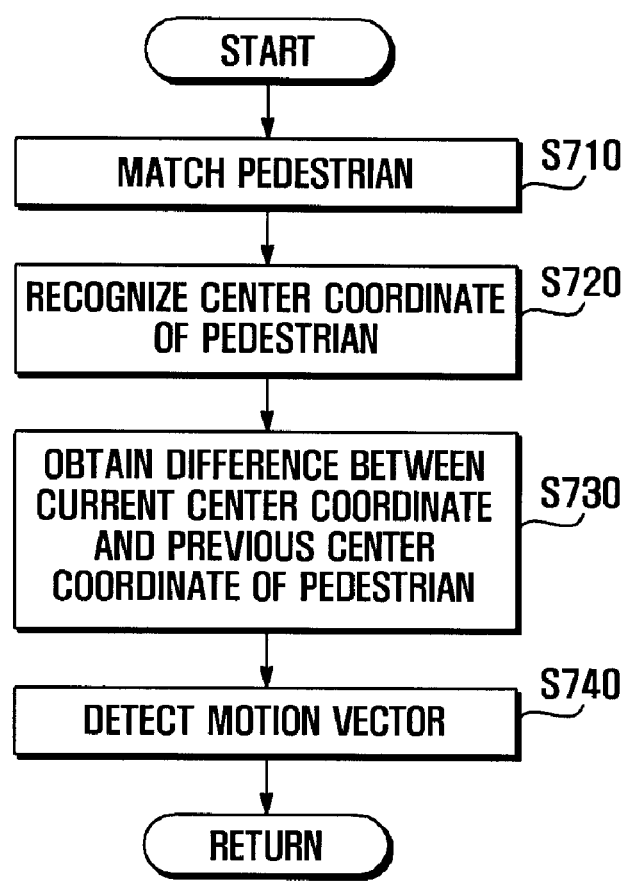
FIG. 7 is a flowchart illustrating in exemplary detail the step S450 of tracing the extracted pedestrian from the acquired image and determining a block corresponding to the extracted pedestrian in the block-based object counting apparatus according to an exemplary embodiment of the present invention.

FIG. 7 is a flowchart illustrating in more detail step S450 of tracing the extracted pedestrian from the acquired image and determining a block corresponding to the extracted pedestrian in the block-based object counting apparatus according to the exemplary embodiment of the present invention.

In order to trace the extracted pedestrian, it is assumed that the same pedestrian is traced. Therefore, in step S710, the same pedestrians in the previous image and the current image are matched with each other. That is, after analyzing the characteristics of the extracted pedestrians in the previous image and the current image, a specific pedestrian extracted in the previous image is matched to a corresponding pedestrian in the current image. Thereafter, in step S720, the control unit 380 recognizes the center coordinates of pedestrians, and in step S730, calculates a difference between the center coordinate of the pedestrian in the current image and that in the previous image. In step S740, the control unit may detect motion vectors of pedestrians. The extracted pedestrians may be traced by using motion vectors thereof.

Figure 8:
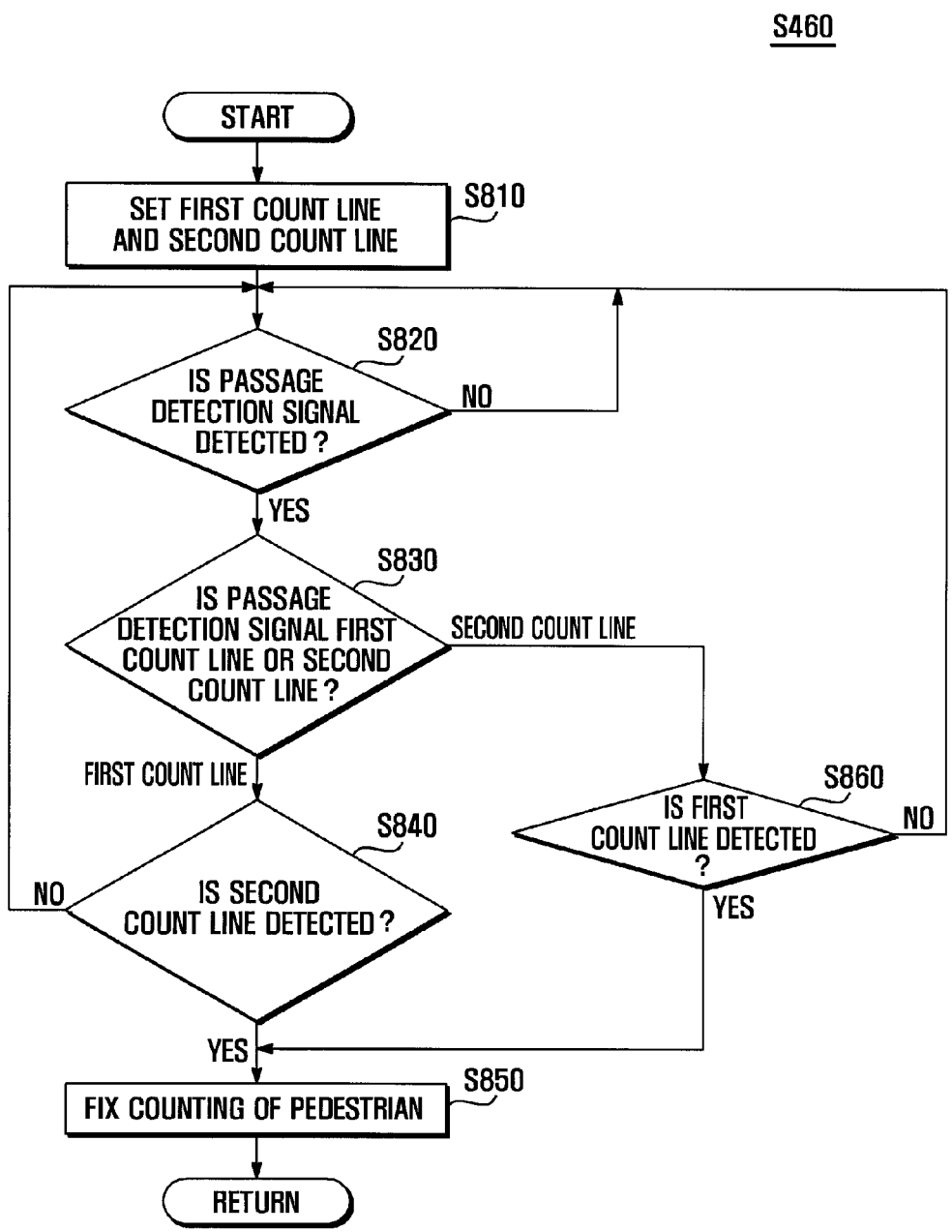
FIG. 8 is a flowchart illustrating in exemplary detail the step 460 of counting the pedestrian passing through a specific block in the block-based object counting apparatus according to an exemplary embodiment of the present invention.

FIG. 8 is a flowchart illustrating in more detail step 460 of counting the pedestrian passing through a specific block in the block-based object counting apparatus according to the exemplary embodiment of the present invention.

In step S810, the control unit 380 sets a first count line and a second count line for determination of counting in an acquired image, in order to fix counting of a pedestrian. In order to fix the counting of a pedestrian, it is necessary for the pedestrian to pass through the second count line after passing through the first line, or vice versa. Therefore, when a pedestrian that has passed through the first count line returns to and passes through the first count line again, or a pedestrian that has passed through the second count line returns to and passes through the second count line again, counting of a pedestrian is not fixed.

In step S820, when a pedestrian passes through a preset count line, the control unit 380 may receive a passage detection signal and recognize it, using a motion vector. In this case, when the control unit 380 determines that the passage detection signal is one for the first count line in the step S830, it determines that a passage detection signal for the second count line is detected in step S840. When the control unit 380 detects a passage detection signal informing that a pedestrian that passed through the first count line passes the second count line in step S840, counting of the pedestrian is fixed in step S850.

On the other hand, when the control unit 380 determines that the passage detection signal is one for the second count line in step S830, it determines that a passage detection signal for the first count line is detected in step S860. When the control unit 380 detects a passage detection signal informing that a pedestrian that passed through the second count line passes the first count line in step S860, counting of the pedestrian is fixed in step S850 likewise.

Figure 9:
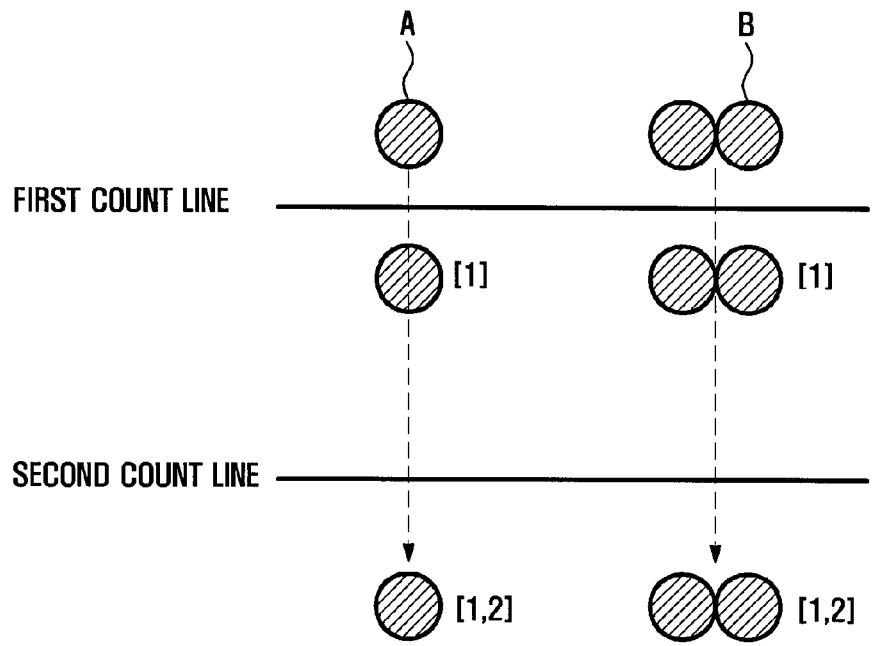
FIG. 9 is a view illustrating an example of fixing counting of the pedestrian passing through the specific block by considering the size of the pedestrian, in the block-based object counting apparatus according to an exemplary embodiment of the present invention.

FIG. 9 is a view illustrating an example of fixing the counting of the pedestrian passing through the specific block by considering the size of the pedestrian, in the block-based object counting apparatus according to the exemplary embodiment of the present invention.

A pedestrian "A" is counted as one, considering an average size and an error of a pedestrian in a partitioned block, and counting of one pedestrian is fixed when the pedestrian A passes through a first count line first and then through a second count line.

On the other hand, pedestrians "B" are counted as two, considering an average size and an error of pedestrians in a partitioned block, and counting of two pedestrians is fixed when the pedestrians B pass through a first count line first and then through a second count line.

Figure 10:
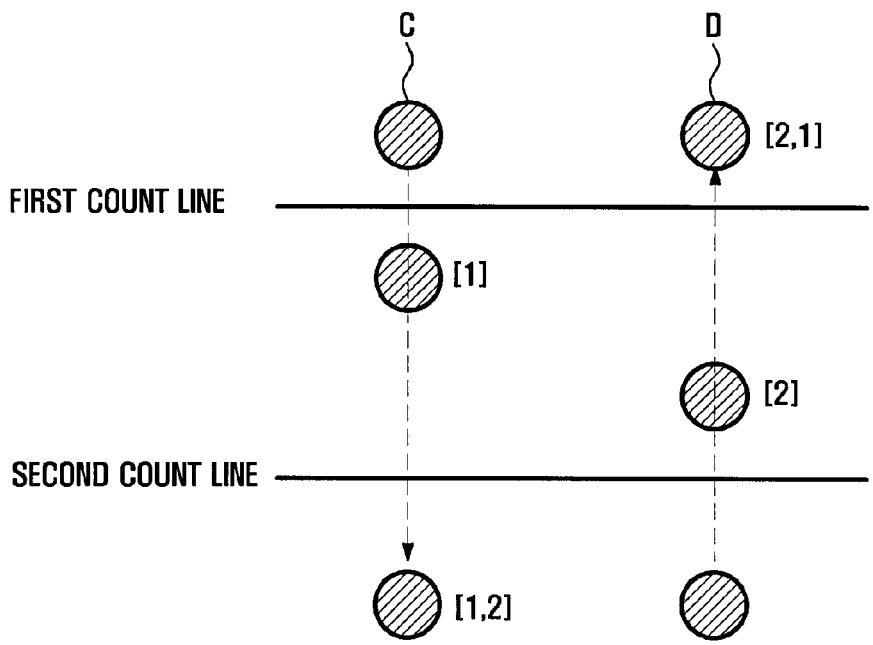
FIG. 10 is a view illustrating an example of fixing counting of the pedestrian passing through the specific block by considering the moving direction of the pedestrian, in the block-based object counting apparatus according to an exemplary embodiment of the present invention.

FIG. 10 is a view illustrating an example of fixing counting of the pedestrian passing through the specific block by considering the moving direction of the pedestrian, in the block-based object counting apparatus according to the exemplary embodiment of the present invention.

A pedestrian "C" is counted as one, considering an average size and an error of a pedestrian in a partitioned block, and counting of one pedestrian is fixed when the pedestrian C passes through a first count line first and then through a second count line.

On the other hand, a pedestrian "D" is counted as one likewise, and counting of one pedestrian is fixed when the pedestrian D passes through a second count line first and then through a first count line.

Figure 11:
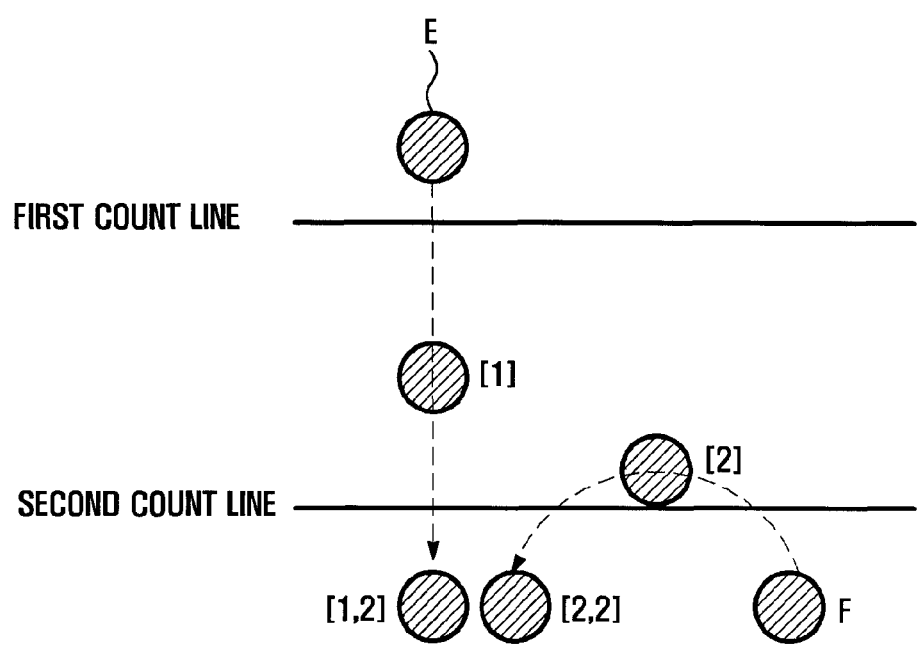
FIG. 11 is a view illustrating another example of fixing the counting of a pedestrian passing through a specific block by considering the size of the pedestrian, in the block-based object counting apparatus according to an exemplary embodiment of the present invention.

FIG. 11 is a view illustrating another example of fixing counting of a pedestrian passing through a specific block by considering the size of the pedestrian, in the block-based object counting apparatus according to the exemplary embodiment of the present invention.

A pedestrian "E" is counted as one, considering an average size and an error of a pedestrian in a partitioned block, and counting of one pedestrian is fixed when the pedestrian E passes through a first count line first and then through a second count line.

On the other hand, a pedestrian "F" is counted as one likewise when the pedestrian F passes through a second count line first but then passes through the second count line again. However, in this case, counting of the pedestrian F is not fixed.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims. For example, while pedestrians are used in the above examples as being objects of the count, any other object, including but in no way limited to vehicles, animals, packaged products, are just a few of the many various possible examples of objects to be counted by block-based counting. Also, why the examples above illustrate an image being divided into two image blocks, a larger number of blocks (more than two blocks, or three, four, five . . . etc, etc.) are compatible with the claimed invention.

What is claimed is:

1. A block-based object counting apparatus comprising:
   a camera for acquiring an image of an object to be counted;
   a storage unit for storing predetermined average sizes and error data for a plurality of objects in units of image blocks, wherein an image block of the acquired image is partitioned into two blocks being symmetrical to each other in upward, downward, right, and left directions; and
   a control unit having a data inputter for receiving an input of the acquired image of the object to be counted, an object size determinator for determining appearance of the object to be counted by comparing the current acquired image with a previously acquired image for determining the size of the object, a block determinator for determining a block where the object is located, and a counter for counting the object and for fixing the counting of the object by comparing size and location data of the counted object with data stored in the storage unit.

2. The apparatus of claim 1, further comprising an image calibrator for receiving the acquired image from the data inputter and for calibrating distortion of the acquired image.

3. The apparatus of claim 2, wherein the distortion of the image is calibrated using at least one of a calibration toolbox and Jung's algorithm.

4. The apparatus of claim 2, wherein the distortion of the image is calibrated using both a calibration toolbox and Jung's algorithm.

5. The apparatus of claim 1, wherein the counter traces the object to be counted by detecting a motion vector of the object.

6. The apparatus of claim 5, wherein the counter matches the object to be counted in a current acquired image with the same object in a previously acquired image, and detects the motion vector of the object by obtaining a center coordinate of the object in the current acquired image and a center coordinate in the previously acquired image and calculating a difference there between.

7. The apparatus of claim 1, wherein the counter sets a first count line and a second count line in the acquired image and fixes the counting of the object upon detection of both a first count line passing signal and a second count line passing signal.

8. The apparatus of claim 1, wherein the object to be counted comprises pedestrians.

9. The apparatus of claim 1, wherein the object to be counted comprises vehicles.

10. The apparatus of claim 1, wherein an image block of the acquired image is partitioned into more than two blocks being symmetrical to each other in upward, downward, right, and left directions.

11. A block-based object counting method comprising:
receiving an image acquired by a camera;
storing the received image, having a first plurality of pixels, in a storage unit;
partitioning an image block of the object into two blocks that are symmetrical to each other in the upward, downward, right, and left directions;
determining average sizes and errors of an object in units of image blocks;
extracting an object to be counted from the acquired image for determining a block containing the object;
counting the object;
fixing the counting of the object, by comparing size and location data of the counted object with data stored in the storage unit;
updating the received image, including the first plurality of pixels thereof, using the extracted object and the counting of the object to generate an updated image having a second plurality of pixels; and
storing the updated image, having the second plurality of pixels, in the storage unit.

12. The method of claim 11, further comprising calibrating a distortion of the image acquired by the camera.

13. The method of claim 12, further comprising using one of a calibration toolbox and Jung's algorithm when calibrating the distortion of the image.

14. The method of claim 12, further comprising using both a calibration toolbox and Jung's algorithm when calibrating the distortion of the image.

15. The method of claim 11, wherein extracting the object from an image acquired by a camera and determining a block containing the object comprises:
comparing and analyzing a current image with a previously acquired image;
determining a presence of an object and extracting the object when a change deviating from a preset range is detected by analyzing the current image and the previously acquired image;
determining the size and location block of the object; and counting the object.

16. The method of claim 15, further comprising storing a reference image.

17. The method of claim 15, wherein the preset range is within five percent.

18. The method of claim 11, further comprising:
matching the object in a current image with the same object in a previously acquired image;
obtaining a center coordinate of the object in both the current image and the previously acquired image; and
detecting a motion vector of the object by calculating a difference between the center coordinate of the object in both the current image and the previously acquired image.

19. The method of claim 11, wherein fixing the counting of the object comprises:
setting a first count line and a second count line in the acquired image; and
fixing the counting of the object when detecting both a first count line passing signal and a second count line passing signal.

20. A block-based object counting apparatus comprising:
a camera for acquiring an image of an object to be counted;
a storage unit for storing predetermined average sizes and error data for a plurality of objects in units of image blocks;
a control unit having a data inputter for receiving an input of the acquired image of the object to be counted, an image calibrator for receiving the acquired image from the data inputter and for calibrating distortion of the acquired image, an object size determinator for determining appearance of the object to be counted by comparing the current acquired image with a previously acquired image for determining the size of the object, a block determinator for determining a block where the object is located, and a counter for counting the object and fixing a counting of the object by comparing size and location data of the object to be counted with data stored in the storage unit.

* * * * *